United States Patent
Shigematsu et al.

(10) Patent No.: US 7,625,543 B2
(45) Date of Patent: Dec. 1, 2009

(54) PRODUCTION PROCESS FOR CARBONIZED PRODUCT AND CARBONIZED PRODUCT OBTAINED BY THE SAME PROCESS

(75) Inventors: Ryusuke Shigematsu, Okayama (JP); Koichi Kanno, Okayama (JP); Takahiro Ojima, Tokyo (JP); Takashi Kojima, Ibaraki (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 497 days.

(21) Appl. No.: 11/062,850

(22) Filed: Feb. 23, 2005

(65) Prior Publication Data

US 2005/0191230 A1 Sep. 1, 2005

(30) Foreign Application Priority Data

Mar. 1, 2004 (JP) ............... 2004-056018

(51) Int. Cl.
- *C01B 31/00* (2006.01)
- *D01F 9/12* (2006.01)
- *D01C 5/00* (2006.01)
- *C01B 31/04* (2006.01)
- *C01B 31/02* (2006.01)
- *C09C 1/48* (2006.01)
- *C09C 1/56* (2006.01)
- *C01B 31/08* (2006.01)

(52) U.S. Cl. ............... 423/445 R; 423/447.2; 423/447.3; 423/447.4; 423/448; 423/453; 423/454; 423/460; 264/29.1; 264/29.3; 264/29.5; 502/418; 502/419

(58) Field of Classification Search ............ 423/445 R, 423/113, 213, 214, 231, 249.1, 249.4, 447.3, 423/447.4, 448, 449, 453, 454, 460; 264/29.1, 264/29.3, 29.5, 29.6, 109, 112, 122
See application file for complete search history.

(56) References Cited

U.S. PATENT DOCUMENTS

| | | | |
|---|---|---|---|
| 3,618,918 A * | 11/1971 | Tembe | ............ 432/113 |
| 4,013,760 A | 3/1977 | Huschka et al. | |
| 4,263,268 A * | 4/1981 | Knox et al. | ............ 423/454 |
| 5,484,520 A * | 1/1996 | Mochida et al. | ............ 208/22 |
| 5,643,426 A * | 7/1997 | Imoto et al. | ............ 204/294 |
| 5,891,822 A | 4/1999 | Oyama et al. | |
| 2002/0037247 A1 | 3/2002 | Pruett | |
| 2005/0191230 A1* | 9/2005 | Shigematsu et al. | ...... 423/445 R |

FOREIGN PATENT DOCUMENTS

| | | | |
|---|---|---|---|
| EP | 0 406 853 | | 1/1991 |
| JP | 6-32608 | | 2/1994 |
| JP | 10338511 A | * | 12/1998 |
| JP | 11-135380 | | 5/1999 |
| JP | 2003-206119 | | 7/2003 |
| WO | WO 02/18671 | | 3/2002 |

OTHER PUBLICATIONS

European Official Action dated Dec. 10, 2008, for Application No. 05 100 955.3-1218.

* cited by examiner

*Primary Examiner*—Jerry Lorengo
*Assistant Examiner*—Jennifer A Smith
(74) *Attorney, Agent, or Firm*—Antonelli, Terry, Stout & Kraus, LLP.

(57) ABSTRACT

Provided is a production process for a carbonized product characterized by comprising the following steps (a) to (b):

(a) a step in which metal-made or ceramic-made plural granular matters are charged into a heat treating apparatus which is maintained at a temperature of 400° C. or higher and 700° C. or lower and allowed to move therein and in which a carbonized product precursor is fed into the above apparatus and subjected to heat treatment, whereby the carbonized product is adhered on the surface of the above granular matters and (b) a step in which the carbonized product adhered on the surface of the granular matters is heated at a higher temperature than the heat treating temperature in the step (a) and 900° C. or lower, whereby the carbonized product is separated from the granular matters. The present invention provides a production process for an inexpensive and useful carbonized product by simple apparatus and steps.

8 Claims, No Drawings

PRODUCTION PROCESS FOR CARBONIZED PRODUCT AND CARBONIZED PRODUCT OBTAINED BY THE SAME PROCESS

BACKGROUND OF THE INVENTION

1. Field of the Invention

The present invention relates to a production process for a carbonized product applicable to a raw material for a carbon material used as a storage battery such as an electric double layer capacitor electrode material and a lithium secondary battery negative electrode material and a raw material for a graphite material used in the high technology fields of semiconductors, atomic power, nuclear fusion, space air navigation and the like, a carbonized product obtained by the above production process, activated carbon for an electric double layer capacitor electrode obtained by subjecting the above carbonized product to activation treatment and a carbon material for a lithium secondary battery negative electrode obtained by subjecting the above carbonized product to graphitization treatment.

2. Description of the Related Art

In the past, when producing granular and powder-form carbonized products from heavy oil, coal tar and petroleum pitch, block-form and small lump-form initial heat-treated products were produced, and they were molded or crushed after carbonized. For example, when using pitches as a raw material, usually carried out was a process in which the raw material was subjected to heat treatment in a muffle furnace or a controlled atmosphere furnace to produce an undissolved and unmolten initial heat-treated product and in which it was molded, crushed or classified after carbonized. However, such process had the difficulties that steps were complicated and that productivity was low, and industrialization thereof was difficult.

Further, synthetic pitches obtained by polymerizing polyaromatic hydrocarbons such as naphthalene and methylnaphthalene under the presence of hydrogen fluoride and boron trifluoride which are ultra strong acid catalysts had the characteristic that they were molten and foamed to a volume of several ten times based on the raw material if carbonized as they were. Accordingly, a process in which they are carbonized as they are had the defect that industrialization thereof was difficult because of a notably low volume efficiency.

Disclosed is a process in which in order to inhibit melting and foaming in a carbonization step, a reactor is charged in advance with a granular or powder-form carbonized product and in which a raw material pitch is fed under stirring by means of a stirring blade and a double shaft rotator and subjected to heat treatment (refer to, for example, Japanese Patent Application Laid-Open No. 286181/1995). In the above process, however, lumps were liable to be produced because a carbonized product having a low density was used, and a complicated stirring mechanism was required in order to allow the content to satisfactorily move. Accordingly, it had the defect that an expensive apparatus was required.

SUMMARY OF THE INVENTION

An object of the present invention is to solve the problems described above on conventional techniques and provide a production process for an inexpensive and useful carbonized product by simple apparatus and steps.

Intensive investigations repeated by the present inventors in order to solve the problems described above have resulted in finding that metal- or ceramic-made plural granular matters are allowed to move in a heat treating apparatus which is maintained at a constant temperature, and a carbonized product precursor is fed into the above heat treating apparatus, whereby the carbonized product is adhered on the surface of the granular matters; the carbonized product adhered is readily peeled off from the granular matters by further treating at a higher temperature than the above heat treating temperature; activated carbon obtained by subjecting the carbonized product peeled off to activation treatment is useful as an electrode material for an electric double layer capacitor; and a carbon material obtained by subjecting the carbonized product peeled off to heat treatment at a temperature exceeding 900° C. is useful as a negative electrode material for a lithium secondary battery. Thus, they have come to achieve the present invention. That is, the present invention comprises the following items.

(1) A production process for a carbonized product characterized by comprising the following steps (a) to (b):

(a) a step in which metal-made or ceramic-made plural granular matters are charged into a heat treating apparatus which is maintained at a temperature of 400° C. or higher and 700° C. or lower and allowed to move therein and in which a carbonized product precursor is fed into the above apparatus and subjected to heat treatment, whereby the carbonized product is adhered on the surface of the above granular matters and (b) a step in which the carbonized product adhered on the surface of the granular matters is heated at a higher temperature than the heat treating temperature in the step (a) and 900° C. or lower, whereby the carbonized product is separated from the granular matters.

(2) The production process for a carbonized product as described in the item (1), wherein the carbonized product precursor is obtained by polymerizing polyaromatic hydrocarbon used as a raw material under the presence of hydrogen fluoride and boron trifluoride.

(3) The production process for a carbonized product as described in the item (1) or (2), wherein the heat treating apparatus is a rotary kiln.

(4) The production process for a carbonized product as described in the item (3), wherein the rotary kiln has a tip speed ranging from 0.1 to 10 m/minute in subjecting the carbonized product precursor to the heat treatment.

(5) The production process for a carbonized product as described in any of the items (1) to (4), wherein a charge amount of the granular matters ranges from 1 to 50 vol % based on a content volume of the heat treating apparatus.

(6) The production process for a carbonized product as described in any of the items (1) to (5), wherein the granular matters have a true density of 2 g/ml or more.

(7) The production process for a carbonized product as described in any of the items (1) to (6), wherein a material of the granular matters is stainless steel, alumina or zirconia.

(8) A carbonized product obtained by the production process as described in any of the items (1) to (7).

(9) An activated carbon for an electric double layer capacitor electrode obtained by adding 1 to 4 parts by weight of an alkali metal hydroxide to 1 part by weight of the carbonized product as described in the item (8) and subjecting the mixture to activation treatment in a temperature range of 400 to 900° C.

(10) A carbon material for a lithium secondary battery negative electrode obtained by subjecting the carbonized product as described in the item (8) to heat treatment at a temperature exceeding 900° C.

Carrying out-the present invention makes it possible to produce an inexpensive and useful carbonized product by simple apparatus and steps, and it is industrially significant to a very large extent.

DESCRIPTION OF THE PREFERRED EMBODIMENTS

The carbonized product precursor (hereinafter referred to as the raw material carbon) used in the present invention shall not specifically be restricted, and, for example, petroleum pitch, coal tar pitch, PVC (polyvinyl chloride) and synthetic pitch are used therefor. Among them, synthetic pitches obtained by polymerizing polyaromatic hydrocarbons such as naphthalene, methylnaphthalene, anthracene, phenanthrene, acenaphthene, acenaphthylene and pyrene under the presence of hydrogen fluoride and boron trifluoride which are ultra strong acid catalysts have a high chemical purity, as shown in U.S. Pat. No. 2,931,593, U.S. Pat. No. 2,621,253 or U.S. Pat. No. 2,526,585, enables to control properties and have a high crystallinity unlike other pitches, and therefore they are most suitably used.

The heat treating apparatus used in the present invention shall not specifically be restricted as long as it can stand a high temperature of at least 400° C. and has a mechanism in which the granular matters charged into the inside of the apparatus are allowed to move. It may be a longitudinal type or a lateral type, and it shall be out of the problem that the apparatus is equipped with a stirring blade and a spiral as a mechanism for allowing the granular matters to move. In particular, the heat treating apparatus of a rotary kiln type which has a simple structure and is readily industrialized is suitably used. The materials of the reactor and the stirring blade shall not specifically be restricted as long as they can stand a temperature required for heat treatment and corrosiveness brought about by resulting inorganic gas and raw material carbon, and they include stainless steel as a general material.

The granular matter used in the present invention is used as a heating medium and a transferring medium and shall not be restricted in a material, and it is selected from metal-made or ceramic-made matters from the viewpoints of a quality and an easiness in availability. Among them, suited are stainless steel, alumina and zirconia which are relatively inexpensive and excellent in a hardness and a toughness.

The above granular matter has preferably a true density of 2 g/ml or more. The true density of 2 g/ml or more makes it less liable to form the lump of the carbonized product and makes it easy to maintain the movability.

The form of the granular matter shall not specifically be restricted as long as it does not have a sharply pointed part, and it may have irregularities on the surface thereof. The spherical matter and the elliptic matter are suitably used. The spherical matter used for ball mills and bearings which are usually produced in an industrial scale is most preferred. Use of the granular matter having a sharp form makes scratches on the surfaces of the reactor and the granular matter by the edge part thereof or allows impurities to be mixed, which are caused by the above scratches, and therefore it is not preferred.

The granular matter has an optimum size depending on the size of the apparatus, the operating conditions and the material of the granular matters, and therefore it shall not specifically be restricted in a size. In the case of, for example, the spherical matter, the granular matter having a diameter falling in a range of 1 to 100 mm is used from the viewpoint of a handling property. The granular matter having a diameter of 10 to 50 mm is preferably selected. The kind of the granular matters used at one time is not limited, and they may be used alone or in combination of two or more kinds thereof at one time.

The process of the present invention comprises a step in which the metal- or ceramic-made plural granular matters are charged into a heat treating apparatus maintained at a constant temperature and allowed to move therein and in which the raw material carbon is fed into the above heat treating apparatus to thereby adhere the carbonized product on the surface of the granular matters (step (a)) and a step in which the above granular matters adhered thereon with the carbonized product are heated at a higher temperature than the heat treating temperature in the step (a) and 900° C. or lower to thereby separate the carbonized product from the above granular matters (step (b)). The step (b) may be carried out subsequently to the step (a) by means of a single heat treating apparatus, or plural heat treating apparatuses may be used, wherein after the step (a), the content may be transferred into another heat treating apparatus, and then the step (b) may be carried out.

In the step (a), an amount of the granular matters charged into the heat treating apparatus is varied depending on the form of the heat treating apparatus and the kind of the granular matters, and it falls in a range of 1 to 50 vol %, preferably 3 to 30 vol % and more preferably 5 to 15 vol % based on a content volume of the heat treating apparatus. If it is too large, a charged amount of the raw material carbon is decreased, and therefore the production efficiency is reduced. On the other hand, it is too small, the carbonized product is strongly adhered on the inner wall surface (transfer surface) of the heat treating apparatus and is not peeled off even by carrying out the step (b), and therefore it is not preferred.

When carrying out the heat treatment in the step (a), the granular matters charged into the heat treating apparatus are allowed to move therein by means of a stirring device or by rotation of an apparatus main body as is the case with a rotary kiln. A stirring speed of the stirring blade and a rotating speed of the kiln are determined according to a size of the apparatus, the properties of the raw material carbon, the kind of the granular matters and a feeding speed of the raw material carbon, and therefore they shall not specifically be restricted. When the rotary kiln is used as the heat treating apparatus in the step (a), a tip speed of the kiln main body falls in a range of usually 0.1 to 10 m/minute, preferably 0.5 to 8 m/minute and more preferably 1 to 5 m/minute. If the tip speed is too fast, the carbonized product is liable to be stuck on the wall surface, and if the tip speed is too slow, the heat transfer efficiency is reduced, so that the production rate is lowered.

The heat treating temperature in the step (a) falls, though depending on the properties and the feeding speed of the raw material carbon, in a range of usually 400 to 700° C., and synthetic pitches obtained by polymerizing polyaromatic hydrocarbons under the presence of hydrogen fluoride and boron trifluoride which are ultra strong acid catalysts are subjected to heat treatment in a range of 500 to 600° C. If the heat treating temperature is too low, the carbonized product is adhered on the transfer surface of the heat treating apparatus in a large amount, and therefore it is not preferred. On the other hand, if the heat treating temperature is too high, the heterogeneous carbonized product is produced, and therefore it is not preferred as well. The raw material carbon may be fed either continuously or intermittently as long as the inside of the heat treating apparatus is maintained at a constant temperature.

In the step (b), after finishing the step (a), the granular matters on which the carbonized product is adhered are heated at a higher temperature than the heat treating temperature in the step (a) to thereby peel off the carbonized product from the granular matters. A temperature required for peeling off the carbonized product in the above step is, though depending on the kind of the raw material carbon, usually 500° C. or higher and 900° C. or lower. The treatment may be carried out at a higher temperature if necessary. The carbonized product peeled off and the granular matters may be separated by means of, for example, a device such as a shaking classifying device, and the granular matters are recovered and reused.

Then, the carbonized product separated from the granular matters is turned into the desired carbon material passing through, if necessary, baking treatment, activating treatment, crushing treatment, classifying treatment or molding. The above carbon material is used as a raw material for a storage battery such as an electrode material for an electric double layer capacitor and a lithium secondary battery negative electrode material and a raw material for a carbon-molded article and a graphite-molded article in the high technology fields of semiconductors, atomic power, nuclear fusion, space air navigation and the like.

When the carbonized product obtained according to the present invention is used as an electrode material for an electric double layer capacitor, the carbonized product obtained by separating from the granular matters in the step (b) is further subjected, if necessary, to high temperature treatment, and it is used as the raw material. First, the above carbonized product is crushed to an average particle diameter of about 15 μm and then mixed with an activating agent. Zinc chloride or alkali metal compounds are used for the activating agent. Among the alkali metal compounds, potassium hydroxide and sodium hydroxide are preferred, and among them, potassium hydroxide is particularly preferred. When using potassium hydroxide, one part by weight of the carbonized product powder is evenly mixed with 1 to 4 parts by weight of potassium hydroxide and heated up to 400 to 900° C. under inert gas flow, and it is held for 1 to 20 hours. After finishing the reaction, the reaction mixture is left cooling and subjected to washing treatment by water and alcohol, and then it is dried, whereby activated carbon for an electric double layer capacitor electrode is obtained.

When the carbonized product obtained according to the present invention is used as a carbon material for a lithium secondary battery negative electrode, the carbonized product obtained by separating from the granular matters in the step (b) is crushed and subjected to heat treatment at a temperature exceeding 900° C. and a prescribed temperature of 2000° C. or lower according to the purposes, whereby a carbon powder which has a high purity and is highly graphitized is obtained. A graphite powder for a lithium secondary battery negative electrode having a high purity and a high graphitization degree is produced by further subjecting to heat treatment at a temperature of 2000° C. or higher.

The present invention shall specifically be explained below with reference to examples, but it shall not be, to be natural, restricted to them.

EXAMPLES

Production Example (Production of Raw Material Pitch)

A Hastelloy-made autoclave of 43 liter equipped with a heating device, a stirring device, a discharge port and a nitrogen-introducing line was charged with 15 kg of naphthalene, 750 g of hydrogen fluoride and 635 g of boron trifluoride. The autoclave was heated up to 270° C. in one hour and then heated at the same temperature for 4 hours under stirring. Subsequently, the discharge port at the upper part was gradually opened to an atmospheric pressure, and then heated nitrogen of 350° C. was introduced thereinto to completely remove the catalysts, whereby a raw material pitch having a softening point of 230° C. was obtained.

Example 1

A rotary kiln having a retort content volume of 10 liter (diameter: 20 cm) equipped with a kerosene burner heating device, a raw material-feeding device, a nitrogen flow device and a waste gas line was charged with 5 kg (6.4 vol %) of stainless steel-made balls (true density: 7.9 g/ml) having a diameter of ¾ inch. Carried out for 3 hours was an operation in which the inside temperature was maintained regularly at 550° C. while rotating the kiln at 6 rpm (tip speed: 3.8 m/min) under nitrogen flow to continuously feed the raw material pitch obtained in the production example at 1 kg/hour. The content was taken out after left cooling to find that a carbonized product was adhered uniformly on the balls. Further, the above carbonized product adhered on the balls was heated up to 700° C. at 5° C./min in a tube furnace under nitrogen atmosphere, and it was held at this temperature for 2 hours. The carbonized product separated from the balls after left cooling came up to 2.4 kg.

In order to carry out evaluation thereof as an electrode material for an electric double layer capacitor, the following treatment was carried out. The carbonized product described above was crushed to an average particle diameter of about 15 μm by means of an impact type crusher, and one part by weight of the resulting carbon powder was uniformly mixed with 2 parts by weight of potassium hydroxide, and the mixture was heated up to 700° C. at 5° C./min under nitrogen atmosphere and held at this temperature for 3 hours to carry out activation treatment. After cooled down to a room temperature, the reaction product was thrown into 2-propanol, filtered and repeatedly washed with water until the filtrate became neutral.

The activated carbon thus obtained was mixed with an electroconductive filler (Ketjen black) and a binder (Teflon, registered trademark) in a weight ratio activated carbon: electroconductive filler binder of 90:5:5 to prepare an electrode. In evaluating the electrode, a glass-made double pole type cell was used, and a glass fiber-made separator was interposed between a pair of the electrodes and put into the cell. Propylene carbonate dissolving 1 mole/liter of tetraethylammonium tetrafluoroborate $((C_2H_5)_4NBF_4)$ was used for the electrolyte.

Charge was carried out up to a voltage of 2.7 V at a constant current of 10 mA/g at a room temperature in argon atmosphere, and after further carrying out charge at 2.7 V for 2 hours, discharge was carried out up to 0 V at a constant current of 100 mA/g to calculate an electrostatic capacity from the electric valuable discharged. The electrostatic capacity was calculated according to the following equation based on a carbon weight (activated carbon) in both positive and negative electrodes. The electrostatic capacity Cv (F/ml) per volume was calculated by multiplying the electrostatic capacity Cw (F/g) per weight by a density of the electrode. Electrostatic capacity Cw (F/g)=(electric valuable discharged (AH/g))×3600/2.7

As a result thereof, obtained were an electrostatic capacity of 37.0 F/g per weight, an electrostatic capacity of 34.0 F/ml per volume and an electrode density of 0.92 g/ml.

Example 2

The raw material pitch was carbonized on the same conditions as in Example 1, except that the revolution number of the kiln was changed to 2 rpm (tip speed: 1.3 m/min).

The crushing treatment and the activation treatment were carried out in the same manner as in Example 1 in order to carry out evaluation as an electrode material for an electric double layer capacitor. The activated carbon thus obtained was used to measure the electrostatic capacity. As a result thereof, obtained were an electrostatic capacity of 37.5 F/g per weight, an electrostatic capacity of 36.0 F/ml per volume and an electrode density of 0.95 g/ml.

Example 3

The raw material pitch was carbonized on the same-conditions as in Example 1, except that the revolution number of the kiln was changed to 12 rpm (tip speed: 7.5 m/min).

The crushing treatment and the activation treatment were carried out in the same manner as in Example 1 in order to carry out evaluation as an electrode material for an electric double layer capacitor. The activated carbon thus obtained was used to measure the electrostatic capacity. As a result thereof, obtained were an electrostatic capacity of 36.0 F/g per weight, an electrostatic capacity of 29.2 F/ml per volume and an electrode density of 0.81 g/ml.

Example 4

A SUS 310-made rotary kiln having a retort content volume of 150 liter (diameter: 60 cm) equipped with an electric heater, a raw material-feeding device, a nitrogen flow device, a waste gas line and a product discharge port was charged with 60 kg (6.7 vol %) of zirconia-made balls (true density: 6.0 g/ml) having a diameter of 25 mm. Carried out for 1.5 hour was an operation in which the inside temperature was maintained regularly at 550° C. while rotating the kiln at 2 rpm (tip speed: 3.8 m/min) under nitrogen flow to continuously feed the raw material pitch obtained in the production example at 20 kg/hour. Next, the kiln was heated up to 700° C. as it was and maintained at this temperature for one hour. The content was discharged after left cooling, and the carbonized product separated from the balls came up to 25.2 kg.

The carbonized product thus obtained was subjected to the activation treatment in the same manner as in Example 1 after crushed in order to evaluate it as an electrode material for an electric double layer capacitor. The activated carbon thus obtained was used to measure the electrostatic capacity. As a result thereof, obtained were an electrostatic capacity of 39.3 F/g per weight, an electrostatic capacity of 38.1 F/ml per volume and an electrode density of 0.97 g/ml.

Example 5

A stainless steel-made reactor having a content volume of 5 liter equipped with an electric heater, a stirrer, a nitrogen flow device and a waste gas line was charged with 3 kg (17 vol %) of alumina-made balls (true density: 3.9 g/ml) having a diameter of 15 mm. Carried out for 3 hours was an operation in which the raw material pitch obtained in the production example was continuously fed at 120 g/hour while stirring the kiln at a revolution number of 30 rpm under nitrogen atmosphere and maintaining the inside temperature regularly at 550° C. The content was taken out after left cooling to find that a carbonized product was adhered uniformly on the balls. Further, the above carbonized product was heated up to 700° C. at 5° C./min in a tube furnace under nitrogen atmosphere, and it was held at this temperature for 2 hours. The carbonized product separated from the balls after left cooling came up to 300 g.

The carbonized product separated from the balls was treated in the same manner as in Example 1 in order to carry out evaluation thereof as an electrode material for an electric double layer capacitor. The activated carbon thus obtained was used to measure the electrostatic capacity. As a result thereof, obtained were an electrostatic capacity of 39.4 F/g per weight, an electrostatic capacity of 36.6 F/ml per volume and an electrode density of 0.93 g/ml.

Example 6

The powder of the carbonized product obtained in Example 1 was graphitized at 3000° C. in argon in order to evaluate it as a lithium secondary battery negative electrode material. Polyvinylidene fluoride powder (binder) 10 parts by weight was added to 90 parts by weight of the graphite powder (average particle diameter: 15 μm) thus obtained, and they were blended and mixed using dimethylformamide as a solvent. Then, the solution was coated on a copper foil, and after dried, it was cut out to 1 cm square to prepare a test piece for evaluation. Then, prepared was a half cell in which a solution (concentration: 1.0 mol/L) obtained by dissolving $LiPF_6$ in a mixture of two kinds of ethylene carbonate/diethyl carbonate having a blend ratio of 1/1 was used as an electrolyte and in which a polypropylene-made microporous membrane having a thickness of 50 μm was used as a separator. Lithium metal having a diameter of 16 mm and a thickness of 0.5 mm was used as a counter electrode. A small piece of lithium metal was used as a reference electrode similarly to the counter electrode.

Constant current charge was carried out at a current density of 0.2 mA/cm$^2$ until an electrode potential of the test piece for evaluation to the reference electrode became 1 mV. Then, constant current discharge was carried out at a current density of 0.2 mA/cm$^2$ until an electrode potential of the test piece for evaluation to the reference electrode became 1.5 V to obtain a charge capacity of 367 mAh/g, a discharge capacity of 340 mAh/g and a charge and discharge efficiency of 92.0%.

Comparative Example 1

The rotary kiln used in Example 1 was charged with 1 kg of the raw material pitch obtained in the production example, and it was heated up to 550° C. in one hour while rotating at 6 rpm (tip speed: 3.8 m/min) and then maintained at the same temperature for 3 hours. The content was taken out after cooled to find that a part of the content flowed over from the retort and that a carbonized product which was homogeneous in the whole was not obtained.

Comparative Example 2

The same heat treating operation as in Example 1 was carried out, except that 5 kg of carbonized product powder (true density: 1.5 g/ml) which was subjected to heat treatment was charged in place of the stainless steel-made balls used in Example 1. The content was taken out after cooled to find that the carbonized product was stuck on the inner wall of the kiln and could not be taken out.

What is claimed is:

1. A production process for a carbonized product, produced from a carbonized product precursor which is obtained by polymerizing polyaromatic hydrocarbon under the presence of hydrogen fluoride and boron trifluoride, characterized by comprising the following steps (a) to (b):
   (a) a step in which metal-made or ceramic-made plural granular matters are charged into a heat treating apparatus which is maintained at a temperature of 400° C. or higher and 700° C. or lower and allowed to move therein and in which the carbonized product precursor is fed into the above apparatus and subjected to heat treatment, whereby the carbonized product precursor is carbonized and the carbonized product is adhered on the surface of the above granular matters, wherein the granular matters have a true density of 2 g/ml or more, and have a diameter falling in a range of 10 to 50 mm, and
   (b) a step in which the carbonized product adhered on the surface of the granular matters is heated at a higher temperature than the heat treating temperature in the step (a) and 900° C. or lower, to thereby separate the carbonized product from the granular matters.

2. The production process for a carbonized product as described in claim 1, wherein the heat treating apparatus is a rotary kiln.

3. The production process for a carbonized product as described in claim 2, wherein the rotary kiln has a tip speed ranging from 0.1 to 10 m/minute in subjecting the carbonized product precursor to the heat treatment.

4. The production process for a carbonized product as described in claim 1, wherein a charge amount of the granular matters ranges from 1 to 50 vol % based on a content volume of the heat treating apparatus.

5. The production process for a carbonized product as described in claim 1, wherein a material of the granular matters is stainless steel, alumina or zirconia.

6. The production process for a carbonized product as described in claim 1, wherein said plural granular matters are spherical.

7. The production process for a carbonized product as described in claim 1, wherein the step (b) includes cooling the carbonized product adhered on the surface of the granular materials, after heating the carbonized product adhered on the surface of the granular materials at the temperature higher than the heat treating temperature in the step (a).

8. The production process for a carbonized product as described in claim 1, including the further step, after the step (b), of recovering and reusing the granular matters.

* * * * *